United States Patent [19]

Yoshigai

[11] Patent Number: 5,168,962
[45] Date of Patent: Dec. 8, 1992

[54] BRAKE SHOE AND METHOD FOR ADJUSTING A SHOE CLEARANCE

[75] Inventor: Kenichi Yoshigai, Osaka, Japan

[73] Assignee: Yoshigai Kikai Kinzoku Co., Ltd., Osaka, Japan

[21] Appl. No.: 604,206

[22] Filed: Oct. 29, 1990

[30] Foreign Application Priority Data

Oct. 27, 1989 [JP] Japan .................................. 1-280617
Jun. 16, 1990 [JP] Japan .................................. 2-157900

[51] Int. Cl.$^5$ ................................................ B62L 1/08
[52] U.S. Cl. ................................. 188/24.19; 188/24.12
[58] Field of Search ............... 188/24.11, 24.12, 24.14, 188/24.19, 24.21, 24.22, 71.1, 73.1, 196 M, 250 B, 250 F; 192/111 B

[56] References Cited

U.S. PATENT DOCUMENTS

| | | | |
|---|---|---|---|
| 4,546,858 | 10/1985 | Nagano | 188/24.19 |
| 4,901,823 | 2/1990 | Chang | 188/73.1 |
| 4,938,318 | 7/1990 | Ishibashi | 188/24.19 |
| 5,064,027 | 11/1991 | Akamatsu | 188/24.12 |

FOREIGN PATENT DOCUMENTS 5332209 10/1975 Japan .
5315093 7/1976 Japan .

*Primary Examiner*—Robert J. Oberleitner
*Assistant Examiner*—Chris Schwartz
*Attorney, Agent, or Firm*—Sixbey, Friedman, Leedom & Ferguson

[57] ABSTRACT

A brake shoe includes a mounting portion at its rear side. The mounting portion is angularly adjustable relative to a brake arm. An angular position adjusting member is removably fit in at least the rear end of a shoe body in the direction of rotation of a wheel. The angular position adjusting member and one end of a braking surface are pressed against a wheel rim. After the mounting portion is fixed to the brake arm, the angular position adjusting member is removed. This enables adjustment of a clearance between the wheel rim and the brake shoe.

8 Claims, 5 Drawing Sheets

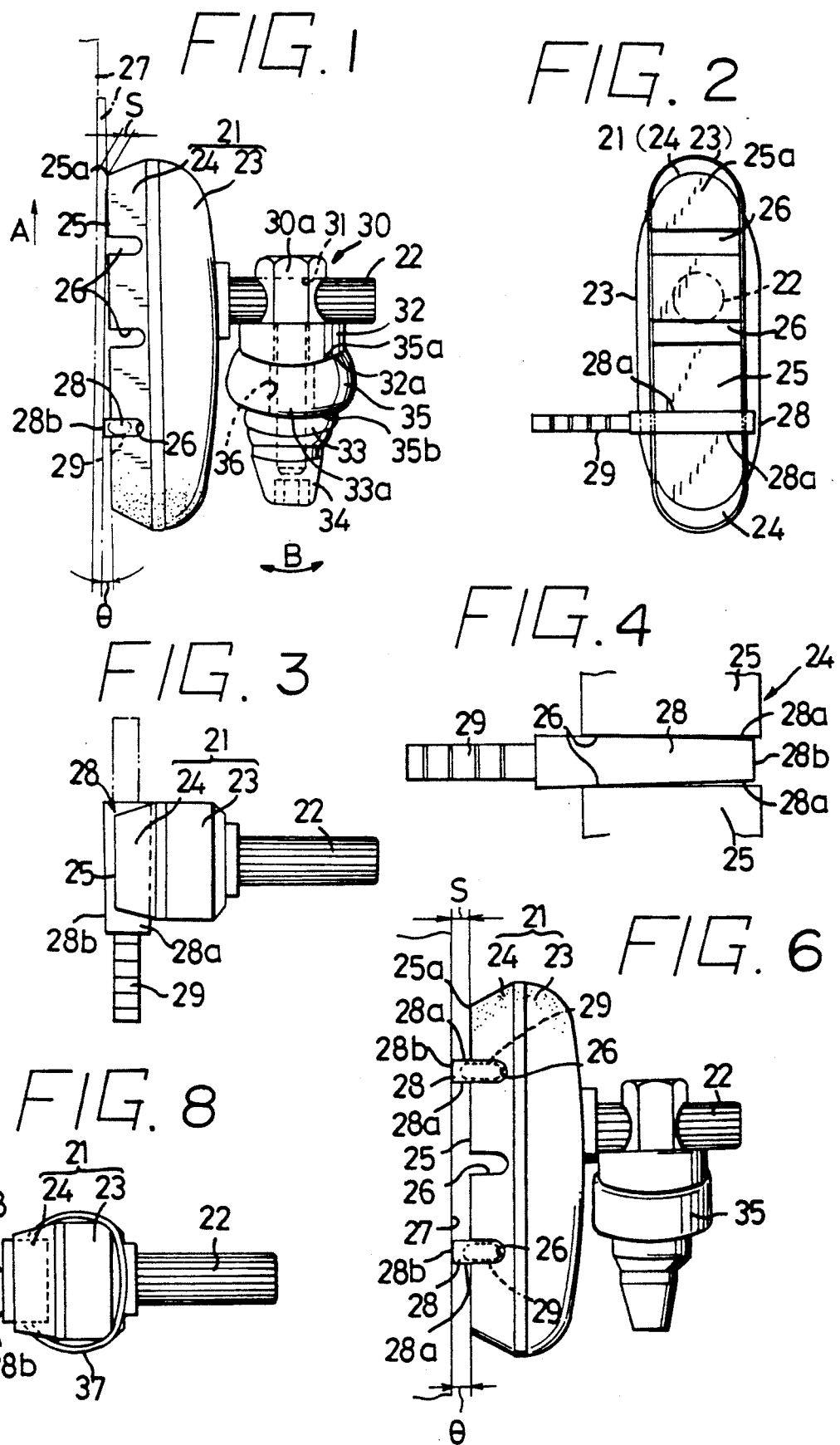

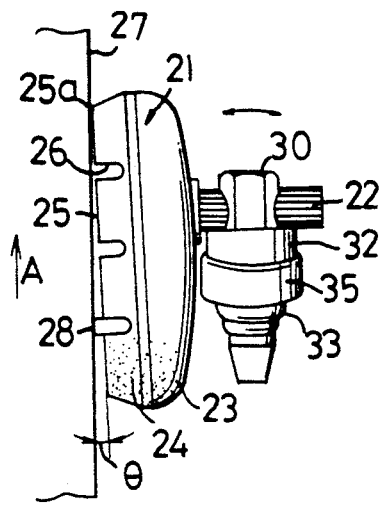
FIG. 5 (I)
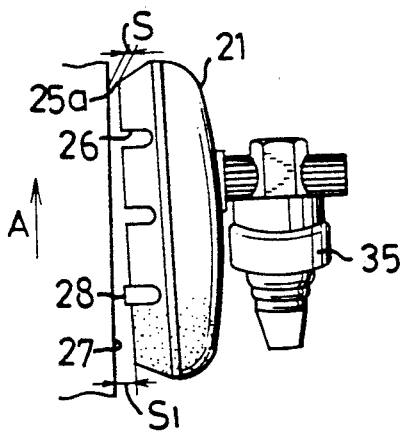
FIG. 5 (II)
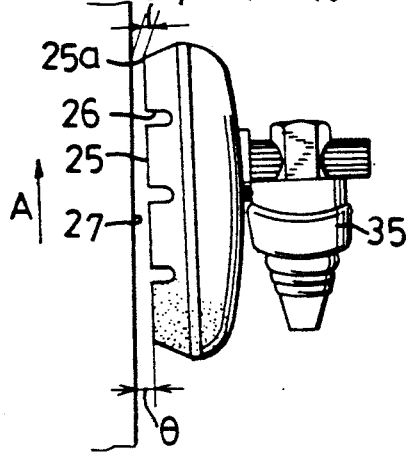
FIG. 5 (III)
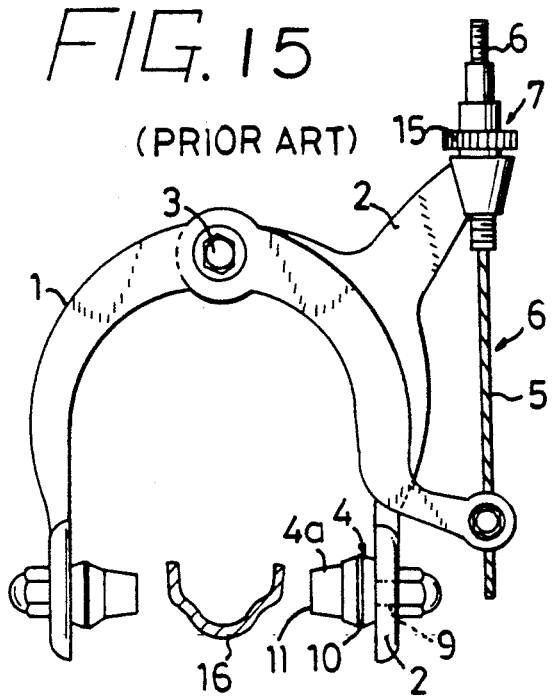
FIG. 15 (PRIOR ART)
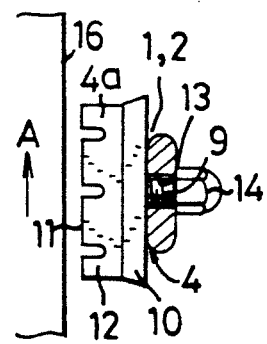
FIG. 16 (PRIOR ART)
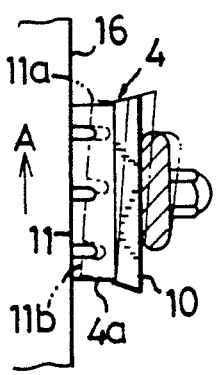
FIG. 17 (PRIOR ART)

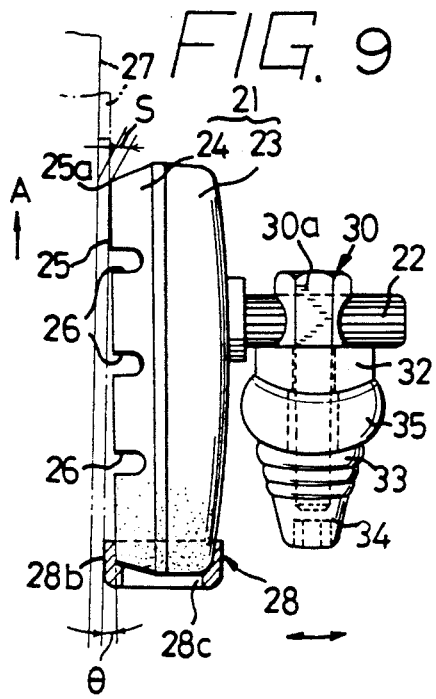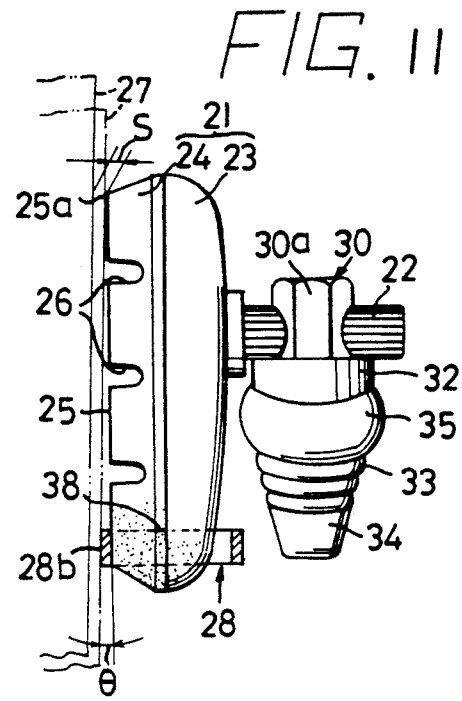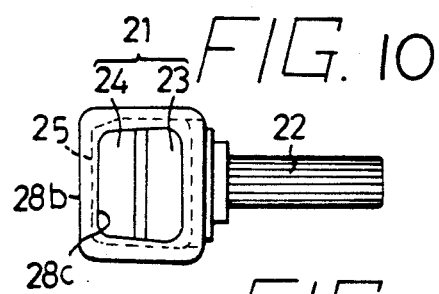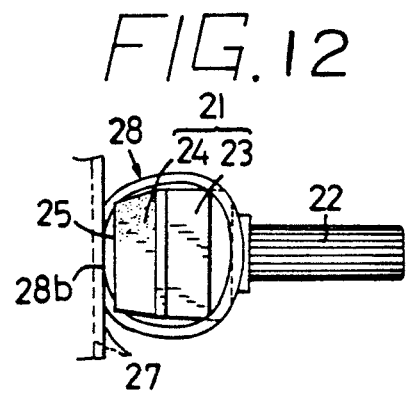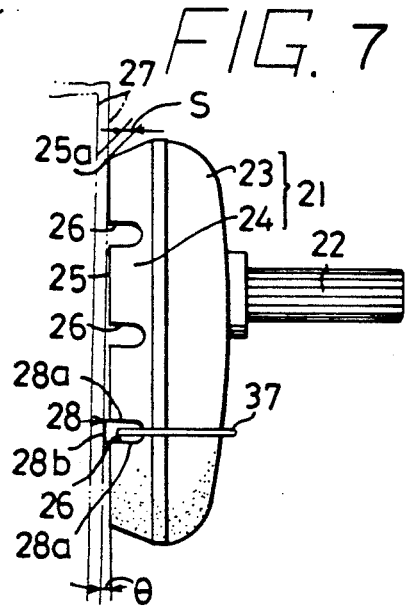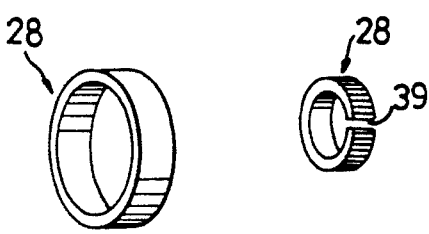

BRAKE SHOE AND METHOD FOR ADJUSTING A SHOE CLEARANCE

FIELD OF THE INVENTION AND RELATED ART STATEMENT

The present invention generally relates to brake shoes and more particularly, to brake shoes for use in a bicycle and a method for adjusting a clearance between a braking surface of each brake shoe and a wheel rim.

Caliper brakes for a bicycle generally include a side-pull type brake, a center-pull type brake, and a cantilever type brake. As shown in FIG. 15, a typical side-pull type caliper brake comprises, among others, a pair of brake arms 1 and 2, a center bolt 3 by which the brake arms 1 and 2 are rotatably mounted to a bicycle body, brake shoes 4 attached to the lower ends of the respective brake shoes 1 and 2 in a face-to-face relationship, a boden cable 8 including an inner wire 5 fixed to the other end of the brake arm 1 and an outer wire 6 mounted to the other end of the brake arm 2 through an outer wire fitting 7, and an unshown spring. As shown in FIG. 16, each brake shoe 4 includes a shoe holder 10. The shoe holder 10 has a mounting portion 9 on its rear side. The mounting portion 9 is in the form of a bolt. A shoe body 4a is secured to the front side of the shoe holder 10 and has a braking surface 11 in which a plurality of discharge grooves are formed. The brake shoes 4 have respective mounting holes 13 through which the mounting portions 9 extend. Nuts 14 are engaged with the mounting portions to secure the brake shoes 4 to the respective brake arms 1 and 2.

The outer wire fitting 7 includes an adjusting nut 15 rotatable to adjust a clearance between the two brake arms 1 and 2 or between a wheel rim 16 and the braking surface 11 of each shoe body 4a.

Normally, the braking surface 11 is in parallel to the wheel rim 16. The brake arms 1 and 2 and the brake shoes 4 are likely to deflect in the direction of rotation of the wheel rim 16 as shown by the interrupted line in FIG. 17 when the braking surfaces 11 are brought into contact with the wheel rim 16 to apply a braking force. Such deflection causes one end 11a or forward end of the braking surface 11 in the direction of rotation of the wheel rim 16 to separate from the wheel rim 16. On the other hand, the other end 11b of the braking surface 11 comes into hard contact with the wheel rim 16. This results in uneven contact of the braking surface 11 with the wheel rim 16 or improper application of a braking force and deteriorates the braking effect. The braking surface 11 of the shoe body is unevenly worn to a considerable extent and is highly subject to damage.

In order to overcome the foregoing problem, there was provided an improved brake shoe (see Examined Japanese Utility Model Publication Sho 53-32209). As shown in FIGS. 18 and 19, the brake shoe includes a shoe body 4a. The shoe body 4a has a braking surface 11 which is inclined at a predetermined angle $\theta$ relative to a wheel rim 16. The entire braking surface 11 may thus be contacted with the wheel rim 16 in a parallel fashion When the brake is applied (see FIG. 19).

Another conventional brake shoe (see Examined Japanese Utility Model Publication SHO 53-15093) is shown in FIGS. 20 and 21. A mounting bolt 18 has a head 18a through which a hole 17 extends at right angles to the axis of the mounting bolt 18. A mounting portion 9 is in the form of a rod and extends through the through hole 17. Brake shoes are adjustably mounted to brake arms 1 and 2 through the mounting bolts 18, spherical washers 19, and nuts 20. A shoe body 4a is inclined at a given angle relative to a braking surface 11.

However, in the former arrangement, the inclined angle of the braking surface 11 relative to the wheel rim 16 varies depending on how the brake arms 1 and 2 are mounted. If not properly mounted, the braking surface can not be inclined at an accurate angle relative to the wheel rim 16, and unstable braking results. A disadvantage of the latter arrangement is that the angular adjustment of the braking surface 11 of the shoe body 4a relative to the wheel rim 16 is cumbersome and time-consuming. It is also difficult to mount both brake shoes 4 in a well-balanced manner.

OBJECTS AND SUMMARY OF THE INVENTION

It is an object of the present invention to provide a brake shoe and a method for adjusting a shoe clearance which enables easy angular adjustment of a braking surface of a shoe body relative to a wheel rim, and easy adjustment of a clearance between the wheel rim and the brake shoe.

In order to achieve the foregoing object, the present invention includes the following technical means.

According to the invention, there is provided a brake shoe including a shoe holder 23 having a mounting portion 22 at its rear side, and a shoe body 24 secured to the front side of the shoe holder 23 and having a braking surface 25, the mounting portion 22 of the shoe holder 23 being angularly adjustable relative to a brake arm 35, characterized by an angular position adjusting member 28 removably mounted to at least the rear end of the shoe body 24 in a direction A of rotation of a wheel.

The angular position adjusting member 28 can be fit in a groove 26 located at least at the rear end of the shoe body 24 in the direction A of rotation of the wheel. The angular position adjusting member 28 is substantially in the form of a cap or in the form of a ring.

According to the invention, there is also provided a method for adjusting a clearance between a brake shoe and a wheel rim, the brake shoe including a shoe holder 23 having a mounting portion 22 at its rear side, a shoe body 24 secured to the front side of the shoe holder 23 and having a braking surface 25, the mounting portion 22 of the shoe holder 23 being angularly adjustable relative to a brake arm 35, and an angular position adjusting member 28 removably mounted to at least the rear end of the shoe body 24 in a direction A of rotation of a wheel, the method comprising the steps of loosening the mounting portion 22 of the shoe holder 23 so as to be angularly movable relative to the brake arm 35, pressing the brake shoe 21 against the wheel rim 27 in such a manner that the angular position adjusting member 28 and one end 25a of the braking surface 25 are in contact with the wheel rim 27, fixing the mounting portion 22 to the brake arm 35 while maintaining a predetermined clearance between the brake arms 35, and removing the angular position adjusting member 28.

The angular position adjusting member 28 has a shoe clearance size.

According to the present invention, the mounting portion 22 is loosened to render the brake shoe 21 angularly movable relative to the brake arm 35. The mounting portion 22 is then fixed to the brake arm 35 while the brake shoe 21 is being so pressed as to bring the angular position adjusting member 28 and the one end 25a of the braking surface 25 into contact with the wheel rim 27. In this manner, the braking surface 25 of each of the opposite brake shoes 21 can be inclined at an accurate angle relative to the wheel rim 27. The boden cable 8 connected to the brake arm 35 is used to adjust a predetermined clearance S between the brake arms 35 or between the wheel rim 27 and the braking surface 25 of the shoe body 24. Thereafter, the angular position adjusting member 28 is removed from the discharge groove 26. This completes the adjustment of the shoe clearance.

In case that the angular position adjusting members 28 with a shoe clearance size are fit in the front and rear ends of the shoe body 24, the clearance S between the brake arms or between the shoe and the wheel rim can be adjusted while the braking surface is being inclined at an angle $\theta$.

The present invention is capable of easily and positively adjusting angular position of the braking surface of the shoe body relative to the wheel rim and the clearance between the wheel rim and the brake shoe. Also, the inclined angle of the braking surfaces of the right and left shoe bodies can be made equal. The present invention thus overcomes various problems such as unstable braking, reduced braking effect and considerable wear due to deflection of the brake shoe upon braking.

BRIEF DESCRIPTION OF THE DRAWINGS

FIGS. 1 to 6 show several embodiments of the present invention;

FIG. 1 is plan view of a brake shoe according to a first embodiment of the present invention;

FIG. 2 is a left side view of the brake shoe shown in FIG. 1;

FIG. 3 is a front view of the brake shoe shown in FIG. 1;

FIG. 4 is an enlarged side view showing the principal part of the brake shoe shown in FIG. 1;

FIGS. 5(I) to 5(III) show the manner in which a clearance between the brake shoe and a wheel rim is adjusted;

FIG. 6 is a plan view of a brake shoe according to a second embodiment of the present invention;

FIG. 7 is a plan view of a brake shoe according to a third embodiment of the present invention;

FIG. 8 is a front view of the brake shoe shown in FIG. 7;

FIG. 9 is a fragmentary plan view of a brake shoe according to a fourth embodiment of the present invention;

FIG. 10 is a front view of the brake shoe shown in FIG. 9;

FIGS. 11 to 14 show a fifth embodiment of the present invention;

FIG. 11 is a plan view of a brake shoe according to the fifth embodiment of the present invention;

FIG. 12 is a front view of the brake shoe shown in FIG. 11;

FIG. 13 is a perspective view of an angular position adjusting member in the form of a ring;

FIG. 14 is a perspective view of a C-shaped angular position adjusting member;

FIG. 15 is a front view of a whole brake system;

FIGS. 16 and 17 are views showing the manner in which the brake shoe is operated;

DETAILED DESCRIPTION OF THE PREFERRED EMBODIMENTS

Figure 18:
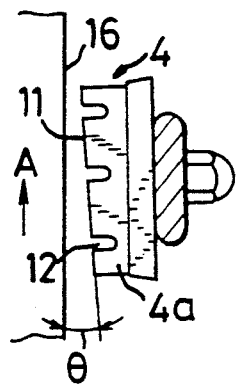
FIG. 18 is a plan view of a conventional brake shoe.
Figure 19:
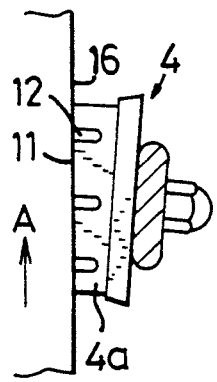
FIG. 19 is a plan view showing the manner in which the brake shoe is forced against the wheel rim.
Figure 20:
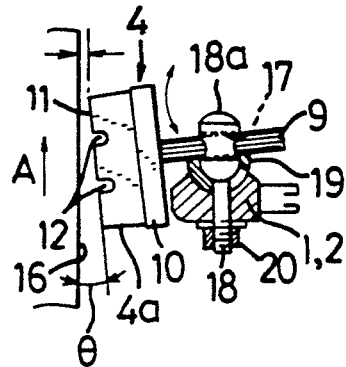
FIG. 20 is a fragmentary plan view of a conventional structure for adjusting a clearance between the brake shoe and the wheel rim.

The present invention will now be described by way of example with reference to the drawings.

With reference to FIGS. 1 to 4, there is shown a brake shoe made according to a first embodiment of the present invention. The brake shoe 21 has a substantially bulge-like shoe holder 23. A rod-like mounting portion 22 extends from the rear side of the shoe holder 23. A shoe body 24 is made of rubber and secured to the front side of the shoe holder 23.

The shoe body 24 has a braking surface 25 in which a plurality of parallel grooves 26 extend in a direction at right angles to the longitudinal direction of the braking surface 25 so as to permit water to flow therethrough. An angular position adjusting member 28 is removably fit in one of the grooves 26 adjacent to the rear end of the braking surface 25 in the direction of rotation of a wheel rim 27 (direction in which a bicycle is advanced).

The angular position adjusting member 28 is made, for example, of synthetic resin, rubber or wood and is in the form of a rod. As shown in FIG. 4, the angular position adjusting member 28 has a surface 28a in contact with the side of the groove 26. The surface 28a is slightly tapered at one end of the adjusting member 28 to facilitate removal of the adjusting member 28 from the groove 26. A gripping piece 29 extends from the other, wider end of the adjusting member 28. The angular position adjusting member 28 projects from the braking surface 25 such that the braking surface may be inclined at the appropriate angle $\theta$ relative to a plane containing a forward end 25a of the braking surface 25 and one end 28b of the angular position adjusting member 28 or the surface of the wheel rim with which the brake shoe is in contact.

Numeral 30 designates a mounting bolt. The mounting bolt 30 has a head 30a in which a through hole 31 extends in a direction at right angles to the axis of the mounting bolt 30. The mounting portion 22 extends through the hole 31.

Numerals 32 and 33 designate washers which have cylindrical surfaces 32a and 33a, respectively. Numeral 34 designates a mounting nut.

Figure 21:
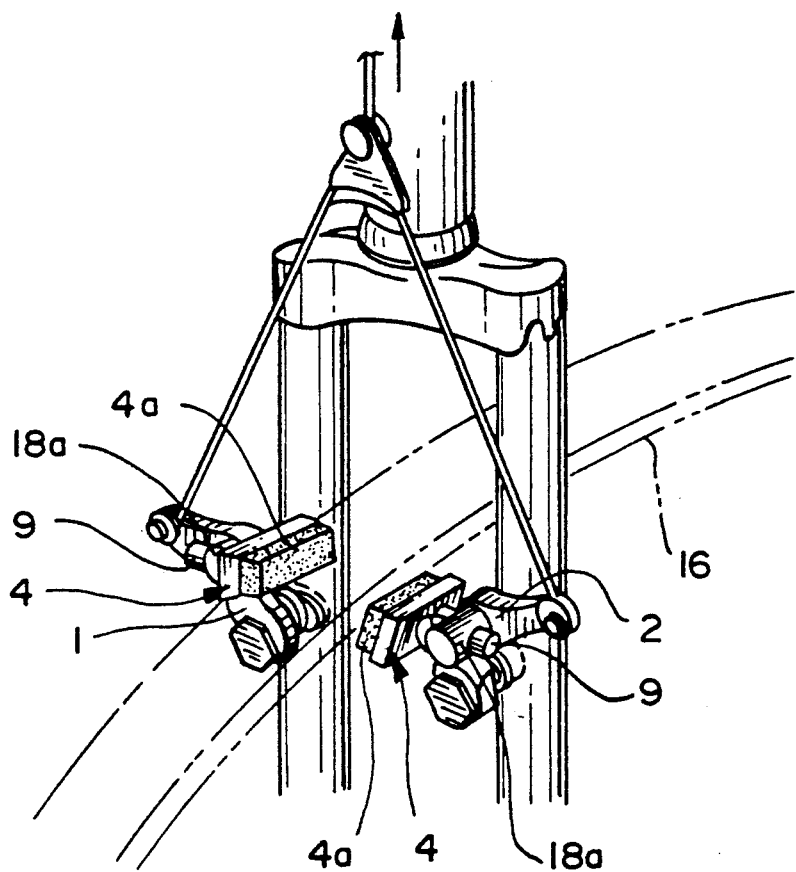
FIG. 21 is a perspective view of a whole braking system of which the FIG. 20 structure forms a part and to which the present invention is applicable.

Numeral 35 designates the right brake arm of right and left brake arms which are identical in shape to those of the conventional cantilever type caliper brake system shown in FIG. 21, the inventive brake shoe 21 and adjusting member 28 being used instead of brake shoe 4 and washer 19. Each brake arm 35 has a mounting hole 36 at its lower end. The mounting hole 36 has opposite cylindrical surfaces 35a and 35b with a vertical central axis. The washers 32 and 33 also have cylindrical surfaces 32a and 33a which are identical in curvature to the cylindrical surfaces 35a and 35b and are contacted therewith.

By this arrangement, the mounting bolt 30 is angularly moved in the direction as shown by the arrow B in FIG. 1. This permits the mounting portion 22 of the shoe holder 23 to be angularly adjustable relative to the brake arm 35.

Reference will now be made to FIG. 5 showing the manner in which the brake shoe 21 according to the first embodiment is mounted or a clearance between the wheel rim and the braking surface of the shoe body is adjusted according to a method of the present invention. The brake shoe 21 is first mounted to the brake arm 35 by the mounting bolt 30 and related components in such a manner that the brake shoe 21 is movable relative to the brake arm 35. Then, the braking surface 25 of the shoe body 24 is pressed against the wheel rim 27 while the angular position adjusting member 28 is positioned at the rear end of the brake shoe in the direction A of rotation of the wheel rim 27. Only one end 25a of the braking surface 25 and the angular position adjusting member 28 are brought into contact with the wheel rim. As a result, the braking surface 25 is inclined at an angle $\theta$ relative to the wheel rim 27 as shown in FIG. 5(I). The mounting nut 34 is rotated to secure the mounting portion 22 to the brake arm 35 through the bolt 30, the washers 32 and 33 and the like. The adjusting nut 15 of FIG. 1 as explained in connection with the conventional brake shoe is next rotated until a clearance S becomes approximately 1 mm as shown in FIG. 5(II). Finally, the angular position adjusting member 28 is removed from the groove while the gripping piece 29 is being gripped. As shown in FIG. 5(III), the clearance S between the front end of the brake shoe and the wheel rim is 1 mm, and a clearance $S_1$ between the rear end of the brake shoe and the wheel rim is 1.5 mm. In this manner, the brake shoe is accurately positioned relative to the wheel rim or inclined at an angle $\theta$.

Although the angular position adjusting member 28 may be removed immediately after the mounting portion 22 of the brake shoe 21 has been secured to the brake arm 35, it is easier to remove the adjusting member 28 after the same is separated from the wheel rim 27.

FIG. 6 shows the brake shoe made according to a second embodiment of the present invention. The second embodiment is different from the first embodiment in that two angular position adjusting members 28 are fit within the two grooves 26 defined at the front and rear ends of the shoe body 24 and project from the braking surface 25 more than the first embodiment to define the clearance S. The other components are identical in structure to those used in the first embodiment and designated by the same reference numerals. Therefore, no details will be given herein.

In the second embodiment, securement of the mounting portion 22 and adjustment of the fitting 7 can be carried out while the both adjusting members 28 are in contact with the wheel rim 27. Thus, the clearance can be more accurately and efficiently adjusted.

FIGS. 7 and 8 show the brake shoe 21 made according to a third embodiment of the present invention. The third embodiment is different from the first embodiment in that the angular position adjusting member 28 has an integral C-shaped engagement element 37, in lieu of the gripping piece 29, to prevent the adjusting member from being released from the brake shoe 21. The other components are identical in structure to those used in the first embodiment and designated by the same reference numerals. Therefore, no details will be given herein In the third embodiment, the angular position adjusting member 28 is prevented from being released from the brake shoe 21 during mounting of the brake shoe to a bicycle. After the angular position of the brake shoe 21 has been adjusted, the engagement element 37 is cut by a knife and the like. As in the first embodiment, the engagement element 37 is pulled to remove the angular position adjusting member 28 from the groove 26.

In order to facilitate mounting of the angular position adjusting member 28 to the brake shoe 21, the engagement element 37 is made of rubber, synthetic resin or other expansible materials. This also allows removal of the angular position adjusting member 28 from the groove 26 without the need for cutting the engagement element 37.

FIGS. 9 and 10 illustrate the brake shoe 21 according to a fourth embodiment of the present invention. The fourth embodiment is different from the first embodiment in that the angular position adjusting member 28, made of a rubber or a synthetic resin material, is substantially in the form of a cap and removably fit over the rear end of the brake shoe 21. The member 28 has a peripheral portion adapted for positioning of the brake shoe 21, and an opening 28c. The other components are identical in structure to those used in the first embodiment and designated by the same reference numerals. Therefore, no details will be given herein.

In the fourth embodiment, the angular position adjusting member 28 can be readily mounted to and removed from the brake shoe 21 and positioned. The adjusting member 28 will not be disengaged from the brake shoe 21 and lost unless a user intentionally removes the same.

FIGS. 11 to 14 illustrate the brake shoe 21 according to a fifth embodiment of the present invention. The fifth embodiment is different from the fourth embodiment in that the angular position adjusting member 28 of the fifth embodiment, made of a rubber, a synthetic resin or other expansible materials, is in the form of a ring, and a positioning mark 38 is provided at the appropriate portion of the shoe holder 23. The other components are identical in structure to those used in the fourth embodiment and designated by the same reference numerals. Thus, no details will be given herein. In the fifth embodiment, the angular position adjusting member 28 is partly separated from the shoe body 24 and the shoe holder 23 due to its resiliency, but its contact surface 28b will become flat during adjustment, so that the brake shoe may be inclined at a predetermined angle $\theta$ relative to the wheel rim. The adjusting member 28 is so flexible in nature as to be closely fit over one end of the brake shoe 21 of any shape and size.

As shown in FIG. 14, the angular position adjusting member 28 is formed by cutting a hose, made of rubber or synthetic resin, into a predetermined length. Each piece may be axially cut as at 39 to provide a C-shaped adjusting member. Advantageously, such a C-shaped adjusting member can be fit to the brake shoe 21 of slightly different shape and size and readily mounted to and removed from the brake shoe 21. In particular, the angular adjustment can be carried out only by loosening the mounting nut 34 without the need for removing the mounting portion of the brake shoe 21.

The fourth and fifth embodiments are both applicable to a brake shoe with no groove 26.

The foregoing embodiments of the present invention are all directed to a cantilever type caliper brake. It is to be understood that these embodiments may be used for a center-pull type caliper brake as well as a side-pull type caliper brake.

The present invention is not limited to the foregoing embodiments. It is to be understood, therefore, that the angular position adjusting member may be modified in material, shape and size. Also, changes may be freely made to a structure for mounting the mounting portion 21 to the brake arm 35, and in particular, to means for adjusting the angular position of the brake shoe. It should be also understood that the groove 27 may be V-shaped or tapered.

What is claimed is:

1. A brake shoe including a shoe holder having a mounting portion at its rear side, and a shoe body secured to the front side of said shoe holder and having a braking surface, said mounting portion of the shoe holder being angularly adjustable relative to a brake arm, said brake shoe comprising an angular position adjusting member removably mounted to extend outwardly from the braking surface of the said shoe body at a rear part thereof in the direction of rotation of a wheel.

2. A brake shoe according to claim 1, wherein said braking surface of the shoe body has grooves, and said angular position adjusting member is removably fit in at least one of said grooves adjacent to a rear end of the shoe body in the direction of rotation of the wheel.

3. A brake shoe according to claim 1, wherein said angular position adjusting member is substantially in the form of a cap.

4. A brake shoe according to claim 1, wherein said angular position adjusting member is substantially in the form of a ring.

5. A method for adjusting a clearance between a brake shoe and a wheel rim, said brake shoe including a shoe holder having a mounting portion at its rear side, a shoe body secured to the front side of said shoe holder and having a braking surface, said mounting portion of the shoe holder being angularly adjustable relative to a brake arm, and an angular position adjusting member removably mounted to at least a rear part of said shoe body in the direction of rotation of a wheel, said method comprising the steps of:
loosening said mounting portion of the shoe holder so as to be angularly movable relative to said brake arm;
pressing said brake shoe against the wheel rim in such a manner that said angular position adjusting member and one end of said braking surface are in contact with said wheel rim;
fixing said mounting portion to said brake arm while maintaining a predetermined clearance between the brake arms; and
removing said angular position adjusting member.

6. A method according to claim 5, wherein the brake surface of the shoe body has grooves; and wherein said angular position adjusting member is removable from one of said grooves located adjacent to a rear end of said shoe body in the direction of rotation of the wheel.

7. A method according to claim 5, wherein said angular position adjusting member is substantially in the form of a cap.

8. A method according to claim 5, wherein said angular position adjusting member is substantially in the form of a ring.

* * * * *